US007377567B2

(12) United States Patent
Walsh

(10) Patent No.: US 7,377,567 B2
(45) Date of Patent: May 27, 2008

(54) LOW FORCE RELEASE MECHANISM AND APPLICATIONS FOR USING THE SAME

(76) Inventor: Michael Frank Walsh, 10414 Woodbury Woods Ct., Fairfax, VA (US) 22032

( * ) Notice: Subject to any disclaimer, the term of this patent is extended or adjusted under 35 U.S.C. 154(b) by 0 days.

(21) Appl. No.: 10/754,394

(22) Filed: Jan. 9, 2004

(65) Prior Publication Data

US 2004/0184874 A1 Sep. 23, 2004

Related U.S. Application Data

(60) Provisional application No. 60/438,774, filed on Jan. 9, 2003.

(51) Int. Cl.
*B64D 17/38* (2006.01)
*B64D 17/00* (2006.01)

(52) U.S. Cl. .............................. 294/82.28; 294/82.25; 403/322.1; 403/DIG. 6

(58) Field of Classification Search ................ 403/321, 403/322.1, 322.2, DIG. 4, DIG. 6; 294/82.25, 294/82.28; 43/7, 9.1, 12; 89/187.02; 279/75, 279/905; 248/317-319
See application file for complete search history.

(56) References Cited

U.S. PATENT DOCUMENTS

| | | | | |
|---|---|---|---|---|
| 845,693 A * | 2/1907 | Coats | ...................... | 294/82.33 |
| 1,027,481 A * | 5/1912 | Huff | ...................... | 294/82.27 |
| 2,502,097 A * | 3/1950 | Linder | ...................... | 294/82.25 |
| 2,837,370 A * | 6/1958 | Stott et al. | ...................... | 294/82.28 |
| 2,928,693 A * | 3/1960 | Cannon, Jr. | ...................... | 294/82.28 |
| 3,009,729 A * | 11/1961 | Eakin | ...................... | 294/82.28 |
| 3,065,011 A * | 11/1962 | De Pew | ...................... | 403/328 |
| 3,066,632 A * | 12/1962 | Bemis | ...................... | 294/82.25 |
| 3,430,305 A * | 3/1969 | Geffner | ...................... | 294/82.28 |
| 3,628,821 A * | 12/1971 | Reece | ...................... | 294/82.28 |
| 3,729,855 A * | 5/1973 | Niskin | ...................... | 43/8 |
| 4,204,711 A * | 5/1980 | Lancelot et al. | ...................... | 294/82.28 |
| 4,523,731 A * | 6/1985 | Buitekant et al. | ...................... | 294/82.28 |
| 4,887,919 A * | 12/1989 | Hamblin | ...................... | 403/16 |
| 4,947,764 A * | 8/1990 | Rohr | ...................... | 109/3 |
| 5,269,579 A * | 12/1993 | DeCrane | ...................... | 294/81.56 |
| 6,168,344 B1 * | 1/2001 | Aguirre, Jr. | ...................... | 403/325 |
| 6,224,013 B1 * | 5/2001 | Chisolm | ...................... | 244/49 |
| 6,354,904 B1 * | 3/2002 | Grey et al. | ...................... | 446/5 |

* cited by examiner

*Primary Examiner*—Daniel P. Stodola
*Assistant Examiner*—Ernesto Garcia

(57) ABSTRACT

A low force release mechanism suitable for use in applications including but not limited to pinatas and dispersion devices comprising an interactive distribution of the load force to the main structure and the structure of a trap employed in the mechanism, the use of an internal spring activation element used to eliminate ordinal setup requirement; and the use of the internal geometry of the trap to lock and hold its position.

6 Claims, 15 Drawing Sheets

Hydraulic Release

Impulse Release

Multi-stage Release

Solenoid Actuated Release

LOW FORCE RELEASE MECHANISM AND APPLICATIONS FOR USING THE SAME

This application claims priority to U.S. Provisional application No. 60/438,774 filed on Jan. 9, 2003 titled "Low Force Release Mechanism."

FIELD OF THE INVENTION

The present invention related to a low force release mechanism, in particular a release mechanism that permits the application of a low or de minimis force to trigger the said release mechanism to move a weight bearing load. The present invention also relates to the use of the low force release mechanism in such varied applications such as pinatas, automatic feeders in agriculture and fisheries, aerial firefighting, parachutes, fishing nets, devices to drop or deliver goods and shipments, and generally in any application that can benefit from the use of low force to release relatively larger weight bearing loads.

BACKGROUND OF THE INVENTION

Low force release mechanisms are often used for closure devices such as door latches, valves, etc., especially in those applications where they effectively substitute for brute force required to release or remove a weight bearing load. However, in many such applications, for the level of force to be subtantially reduced, complicated mechanisms are required with multiple moving parts rendering such devices costly. In addition, the additional moving parts increase wear and tear, with concomitant safety risks. There is a need for an effective low force release mechanism that allows for the movement or handling of heavy loads. Furthermore, there is a need for a low force release mechanism in commercial applications where safety is a paramount issue, and which may be effectively used by users ranging from children to seniors.

OBJECT AND SUMMARY OF THE INVENTION

The present invention is a low force release mechanism that effectively employs a trap and mechanism structure to absorb and support high loads which enables it to significantly increase the load capacity of a release mechanism while at the same time keeping the release force very small in comparison. The novelty of the present invention lies in the interactive use of (i) the structure to accept the major portion of applied load forces; (ii) an internal spring and trap combination for the elimination of an ordinal setup requirement; and (iii) the internal and external geometry of a trap for different locking and/or holding applications.

The invention was conceived from the vantage point of a pinata, a commonly used party favor used at birthdays and other celebrations. Typically, a pinata is filled with candy or other edibles, light toys, etc., and struck with an object such as a stick which causes the pinata structure to break, thus releasing the contents. The original piñata's were often decorated clay pots that were broken by a stick. Presently, there are two types of piñata's, those that you break with a stick and those that you pull a ribbon to tear open a trap door (see U.S. Pat. No, 6,3543,904). A problem with the breaking type piñata is that bystanders are often injured by the swing of the stick, which is required to crack the piñata. This risk is increased when the individual is blindfolded. The second type is constructed in a similar fashion to the breaking type piñata, but instead of rupturing it with a stick, there is a trap door with multiple ribbons attached, only one of which is secured to pull the trap door open.

However, a major problem with both of these types of piñata's is that they are single use items. This can be particular frustrating with the trap door type piñata because if the first person chooses the correct ribbon the game is over. Furthermore, pinatas created out of wood, cardboard, or even thin plywood or plastic piñatas could present a risk if they were to fall. Thus, there existed a need for a viable reusable piñata.

The present invention addresses such a need through the creation of a low force release mechanism that allows the use of a reusable container such as a collapsible bag to be opened by the pulling of a string that triggers the release of the contents of the container or bag. When used in the context of a pinata, the current invention allows multiple strings to be attached to the central structure of the mechanism, so as to enable multiple users to pull at the strings. Only the string attached to the trigger mechanism would cause the container to release its contents. The invention enables this application with ease because it only requires a relatively low force to trigger the release. Depending on the application, low force could mean the kind of force exerted by a pre-pubescent child when pulling on a hanging string. However, if desired, the invention would allow for the force to be increased, especially when the application is geared to use by adults. The invention achieves its goal through the the interactive use of (i) a central mechanistic structure to accept the major portion of applied load forces; (ii) an internal spring and trap combination for the elimination of an ordinal setup requirement; and (iii) the internal and external geometry of a trap for different locking and/or holding application.

DETAILED DESCRIPTION OF THE INVENTION

The concept and application of the low force release mechanism will be shown, described, and illustrated in substantial detail with reference to the presently described embodiment wherein the release mechanism is used to operate a pinata, a well-known party favor. However, it will be understood by those skilled in the art that other embodiments of said pinata may be made that include other and further changes and modifications without departing from the spirit and scope of the invention which is defined by the claims appended hereto. In addition, although the concept and application of the low force release mechanism is shown, described and illustrated with reference to a pinata, said low force release mechanism may also be used in a variety of other applications that will benefit from the use of a low force to release larger weight bearing loads. Such applications include, but are not limited to, automatic feeders in agriculture, fisheries, and livestock yards; aerial firefighting applications in which large volumes of water or fire-retardant materials are released by activating a trigger mechanism; devices to drop or deliver goods and shipments, for example from aircraft, and devices to cause dispersion. In other embodiments, the invention may be used in toilet flapper valve replacements, commercial stopper-release uses, docking clamps, quick release mounting or docking mechanisms.

The low force release device of the invention is characterized by the following elements: a low force to release a trigger, distribution of the weight bearing load and the weight of the device away from the trigger to permit the application of a low force for release, optional use of an internal release activation element, interaction of the internal release activation element with the geometry of the device to permit the application of the low force to result in the movement of the weight bearing load. Furthermore, the low force release device of the invention permits the device to be set up, and re-used, with a minimum of preparation. In one embodiment, the low force release device of the invention can be set up in a single step. Other elements of the invention depending on the application are as follows: the force acting against the force required by the user to release the mechanism should not be perceptibly greater than the force required to release decoy mechanisms; distribution of the weight of the contents and the mechanism away from the trigger pin; use of an internal spring pin that allows the mechanism to be armed before the trap was locked, allowing for a choice of positions at which the internal spring pin may be locked (multi-level trigger concept), and allowing easy movement of the trap once the trigger pin was removed; use of the geometry of an internal trap for lock and release, preferably a sleeve geometry. It must be noted that all the above elements of the invention result in increased efficiency of setup and use.

Figure 1A:
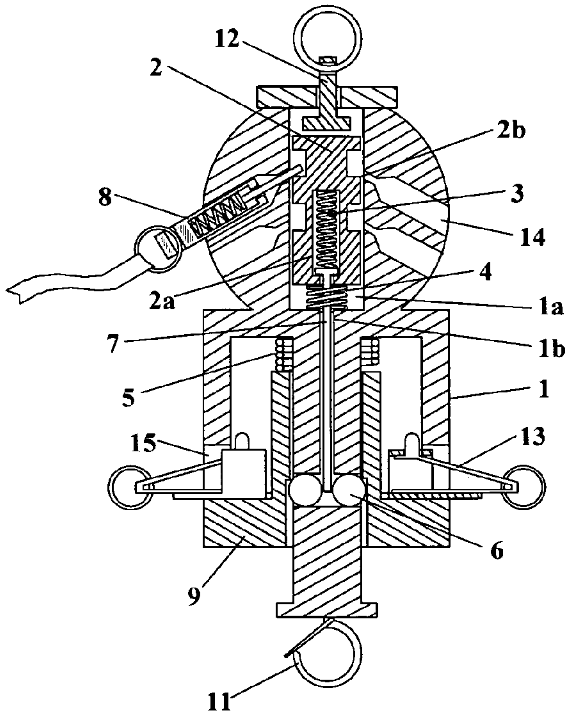
FIG. 1: Low force release mechanism depicting all elements of the invention.
Figure 1B:
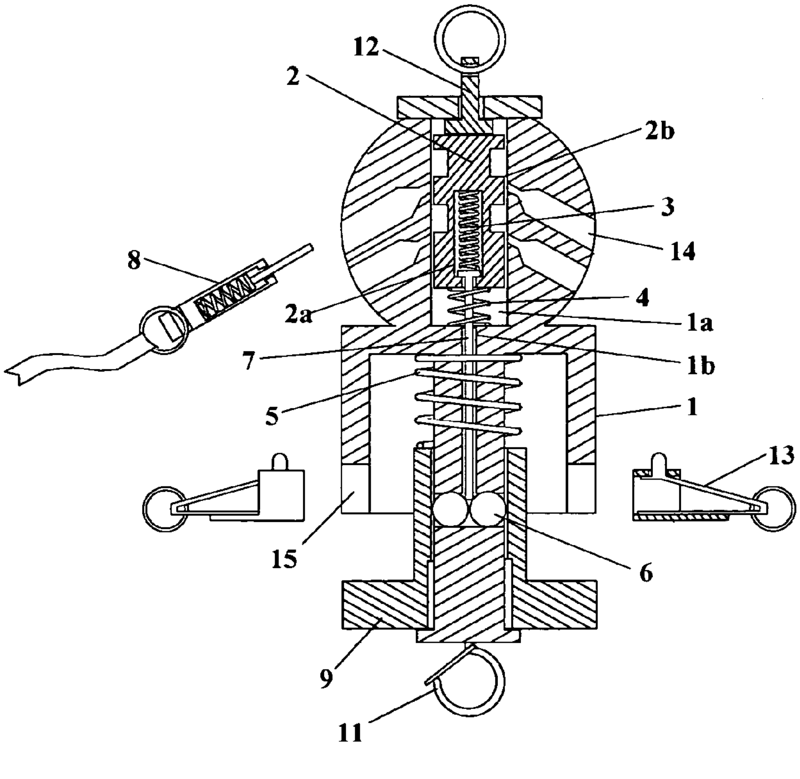

In the embodiment as shown in FIG. 1, the setup and operation of the low force release mechanism is illustrative of the novel qualities of the invention, namely, the distribution of the load force to the main structure and the structure of the trap, the use of an internal spring pin (2) and an internal spring (3) to eliminate ordinal locking of the trap; and the use of the internal geometry of the trap (9) to lock and hold its position. In FIG. 1, the main housing/structure (1) has a cavity (1*a*) and a main shaft (1*b*). An internal spring trigger (8) is inserted through a trigger/decoy hole (14) located on the side of the upper part of the main housing/structure (1). The hanger (12) is then pushed down and in turn pushes the internal spring pin (2) down, compressing the lift spring (4). When the internal spring pin (2) clears the hole that the internal spring trigger (8) was inserted, the trigger pin protrudes and locks the internal spring pin (2) in the down position such that the trigger (8) engages an engaging portion (2*b*) of the internal spring pin (2). Hanger (12), which is not attached to the internal spring pin (2), now serves as a point of external attachment to the main structure. The trap (9) is slide up the main shaft and inside the lower part of the main housing (1) (compressing the trap spring (5)) until the large internal diameter section of the trap (9) is above the ball bearing (6). This allows the ball bearings (6) to separate and release pin (7) to be pushed between them by the internal spring (3) located in a cavity (2*a*) of the internal spring pin (2), this will locks the trap (9) up. The container clips (13), which are examples of attachments by which a container is attached to the main structure and the trap, are then inserted through the slots (15) located on the side of lower part of the main housing (1). When the internal spring trigger pin (8) is pulled out of the main housing (1), the internal spring pin (2) is freed and is pushed up by the lift spring (4). This removes the release pin (7) from between the ball bearings (6). As such, the release pin, the lift spring, and the one or more ball bearings (or e.g., slugs) located in the main structure and within an internal geometry or hollowed portion of the trap interact with the geometry of the trap. The ball bearings (6) now retract and the trap (9) is pushed down by trap spring (5), releasing the container clips (13). As such, the release pin, the trap spring, and the one or more ball bearings (or e.g., slugs) located in the main structure (1) and within an internal geometry of the trap interact with the geometry of the trap. The container clips simplify the setup by allowing insertion or removal after the mechanism has been armed and the trap locked. This significantly simplifies the setup. The mechanism as shown in FIG. 1, amply demonstrates the multi-level trigger concept of the invention, which is the ability to lock the internal spring pin by inserting the internal spring trigger pin on any one or more levels.

Figure 2:
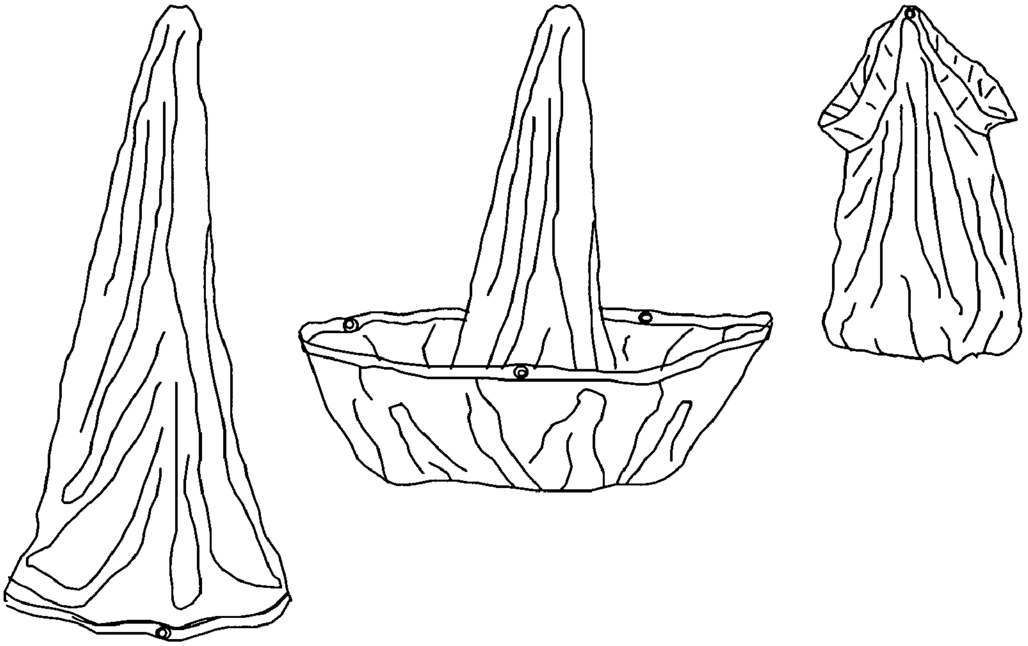
FIG. 2: Collapsible bag used as container in applications such as pinatas.

One embodiment of the container, namely that of a collapsing bag, is shown in FIG. 2. A flexible compartment is formed when you take a cylindrical or cone shaped shell made of a flexible material and fold the base end over the body until the ends meet. Preferably, the flexible material may be formed in a cone shape because the larger base end facilitates the movement over the body. Preferably, the collapsing bag as shown in FIG. 2 is used in applications such as a piñata. In lieu of a collapsing bag, the container could easily be replaced with bins, buckets or the ends of tethers. Furthermore, the release concept could be applied to a large structure or container.

The hanger as depicted in FIG. 1 has the dual purpose of depressing the internal spring pin and also functioning as the mechanism's hanger. Furthermore, the internal spring trigger as shown allows a single step setup by eliminating the need to hold the internal spring pin down while locking it with the trigger pin. When the mechanism of the invention is used to enable the use of a piñata, the hanger makes it possible for all the pins to have the same pull, i.e. requires the same amount of low force needed to pull the trigger.

Figure 5:
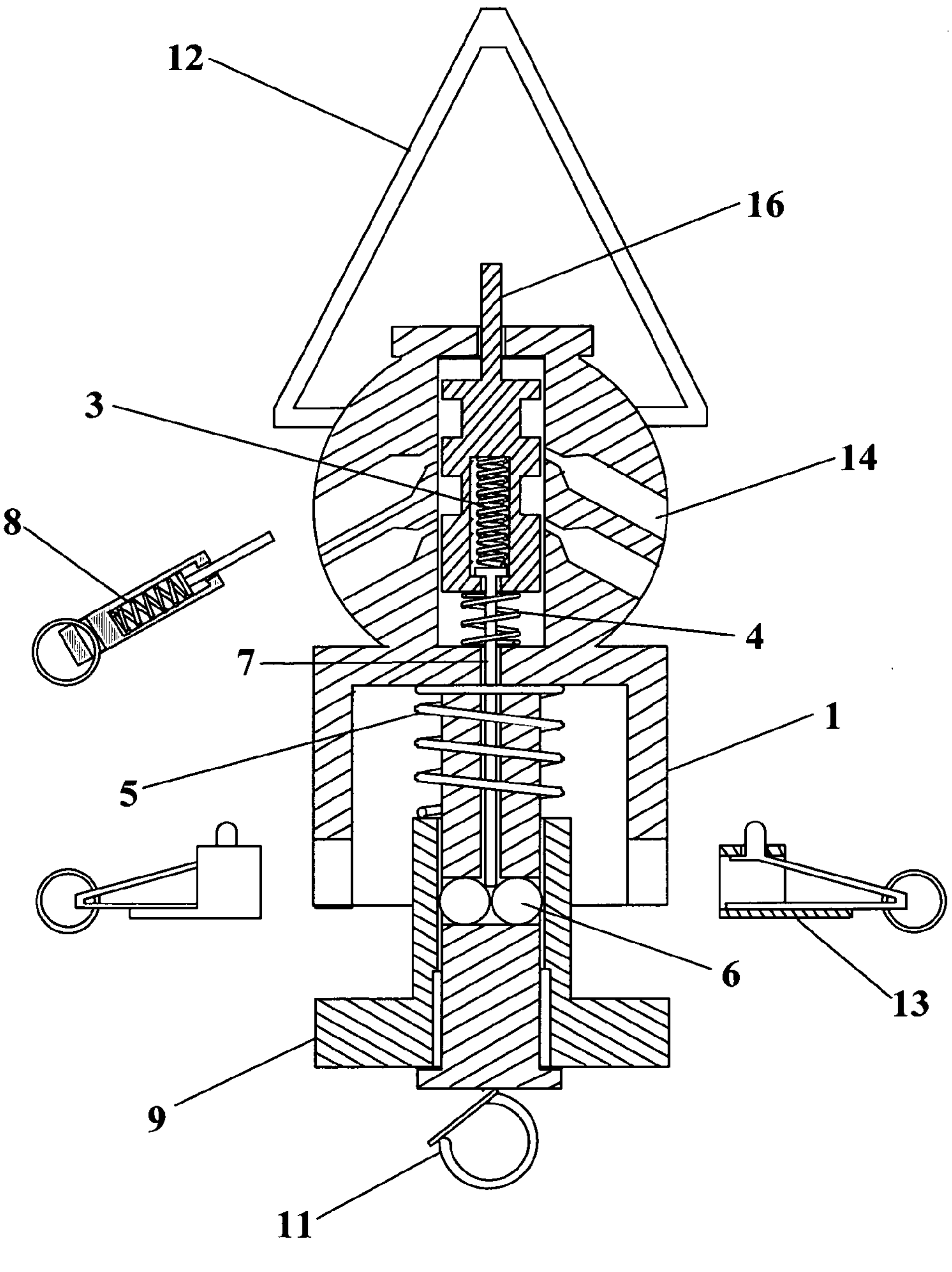
FIG. 5: Optional Hanger arrangement for low force release mechanism.
Figure 6:
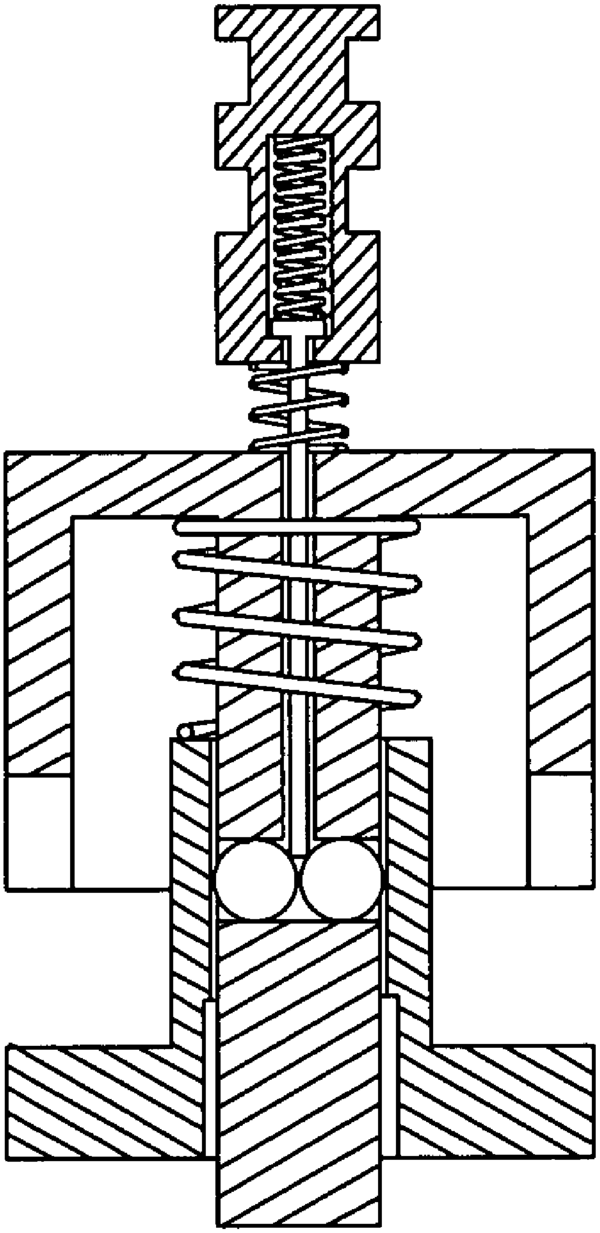
FIG. 6: Depiction of multi-spring interaction in the low force release mechanism.
Figure 7:
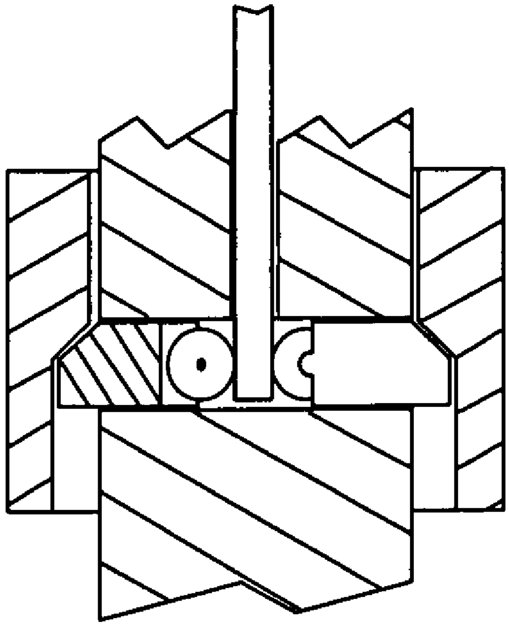
FIG. 7: Depiction of mechanism with roller slugs instead of ball bearings.
Figure 8:
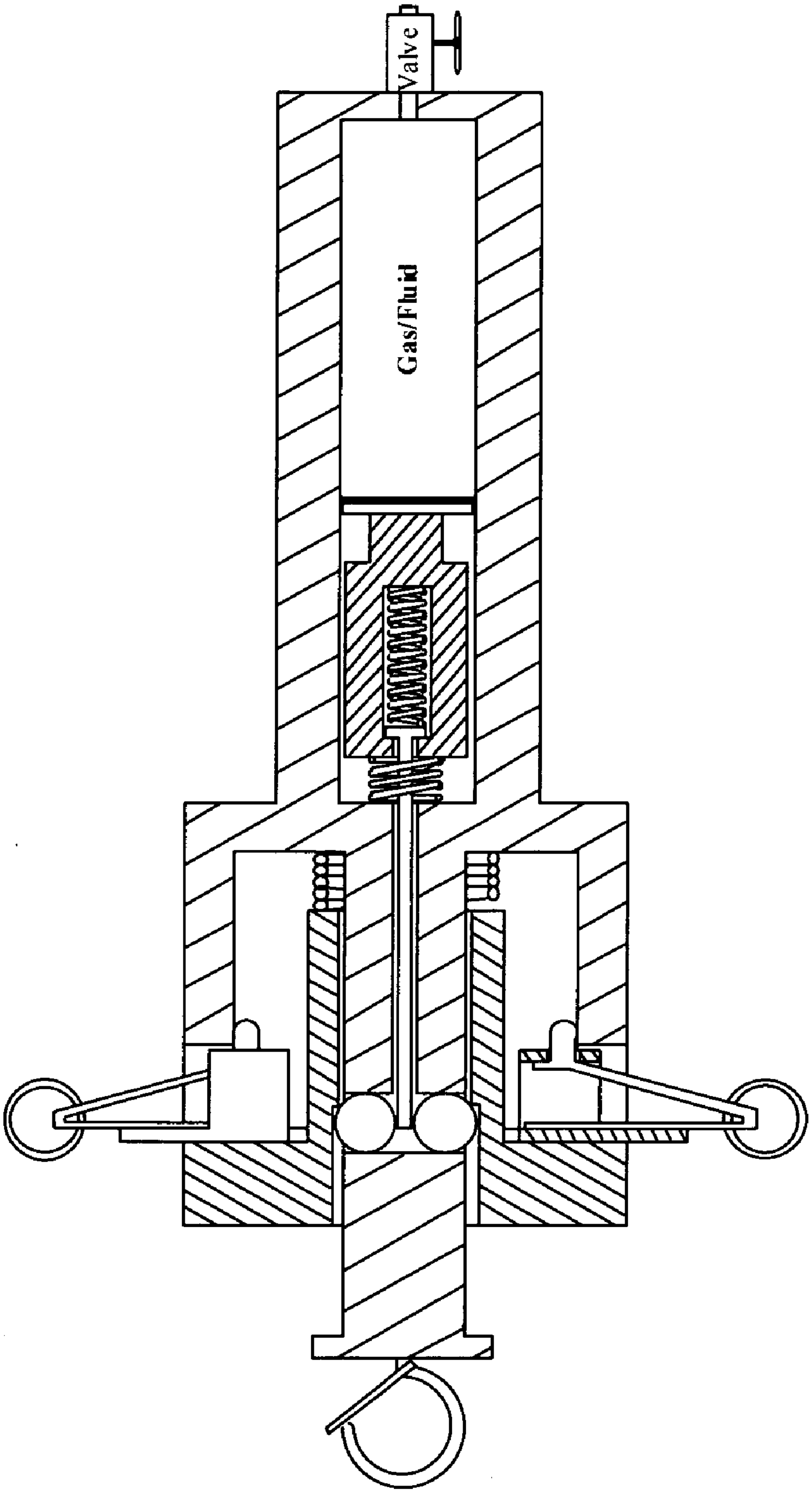
FIG. 8: Hydraulic release trigger mechanism activation system.

In order to show the advantage of the invention's characteristics, in particular the advantage of the hangar mechanism, a further embodiment is depicted in FIG. 5. This embodiment is similar to that shown in FIG. 1, but employs a different hangar design. In the low force release mechanism depicted in FIG. 5, the internal spring pin with an extension (16) is pushed and held down, compressing the lift spring (4). Next, the trigger pin (8) is inserted through a trigger/decoy hole (14) located on the side of the upper part of the main housing/structure (1), locking the internal spring pin with an extension (16) in the down position. The trap (9) is slide up the main shaft and inside the lower part of the main housing (1) (compressing the trap spring (5)) until the large internal diameter section of the trap (9) is above the ball bearings (6). This allows the ball bearings (6) to separate and the release pin (7) to be pushed between them by the internal spring (3), which locks the trap (9) up. The container clips/attachments (13) holding the container holding the objects or material to be released are then inserted through the slots (15) located on the side of lower part of the main housing (1). When the trigger pin (8) is pulled out of the main housing (1), the internal spring pin with an extension (16) is freed and is pushed up by the lift spring (4). This removes the release pin (7) from between the ball bearings (6). This causes the ball bearings (6) to retract, causing the trap (9) to be pushed down by the trap spring (5), and thereby releasing the container clips (13).

Although, this new trap design eliminated any potential for the trap to stick, the hanger bracket was less efficient than the hanger of FIG. 1. For example, when the trigger pin was inserted in a hole aligned with the hanger bracket, the trigger pin could be harder to pull, which is not desirable in a pinata application.

Figure 3:
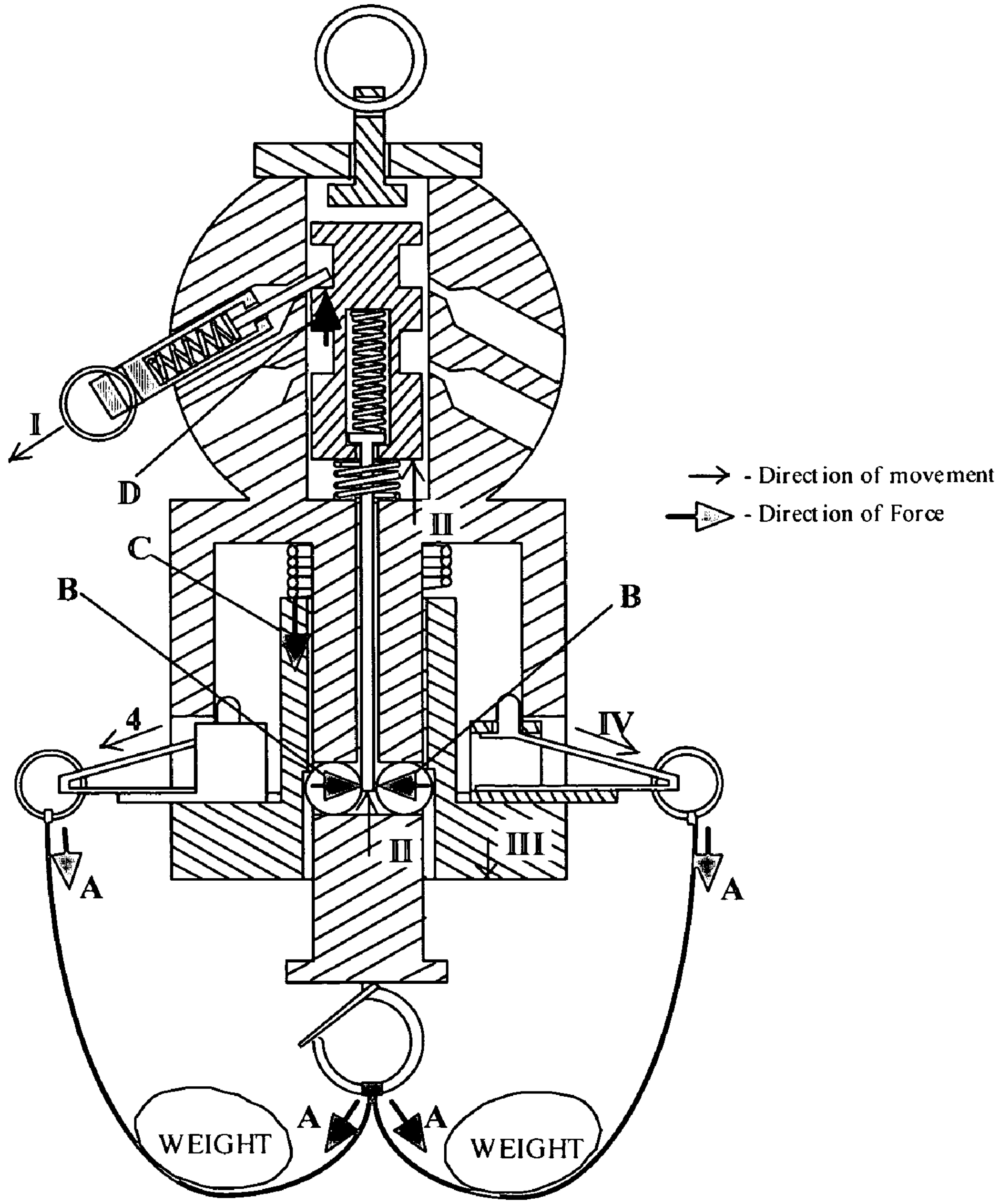
FIG. 3: Depiction of interaction of forces on the low force release mechanism.

The mechanism requires only a low force to pull the trigger and/or decoys because the mechanism is designed such that at least half the container weight is supported by the structure of the mechanism as shown in FIG. 3. FIG. 3 illustrates the load distribution of the mechanism and bag. The reference forces denoted as “A” in the figure depict the manner in which the bag or container distributes the weight between the container clips and the container hook (“11” in FIG. 1). The portion of the weight which is carried by the container clips is then distributed between the main housing and the trap. As shown in FIG. 3, the majority of the weight is transferred to the structure and not the ball bearings and release pin. During loading, for instance, the depression force is equal to the lift spring. Furthermore, at least half the container weight is supported by the structure as depicted. Thus, the structure of the low force release mechanism of the invention is an integral part in the distribution of the weight of the bag and the reduction of force needed to release its contents. The weight on the trap is transferred to the ball bearings, which are prevented from receding into the shaft by the release pin. The reference forces denoted as “B” are the frictional forces between the ball bearings and the release pin that must be overcome to release the container clips. The forces referred to above are not transferred to the release pin and do not factor in to the force required for release.

Furthermore, the locking processes for the mechanisms shown in FIG. 1 are very practical because of the use of an internal spring and release pin combination. The internal spring allows the release pin to move when arming the device with the trap in a released or unlocked position. This feature is particularly useful when attempting to lock a large load.

Mechanisms employing trap and shaft combinations previously seen in the prior art, have were often designed to transfer the full force of the load to ball bearings, if employed, and the release activation device, for example, the release pin. Such mechanisms make setup difficult, or required the use of additional mechanisms to lift and support the full weight of the load before the release activation device may be set, for example the insertion of a release pin. The low force release mechanism of the current invention obviates the need for additional lifting and supporting mechanisms, and the inconvenience of the setup as observed in mechanisms in the prior art.

When the low force release mechanism is used as a pinata, preferably, there are at least 2 pins (with corresponding trigger/decoy holes). However, the mechanism can be designed for as many trigger/decoy holes as the surface allows.

Figure 4:
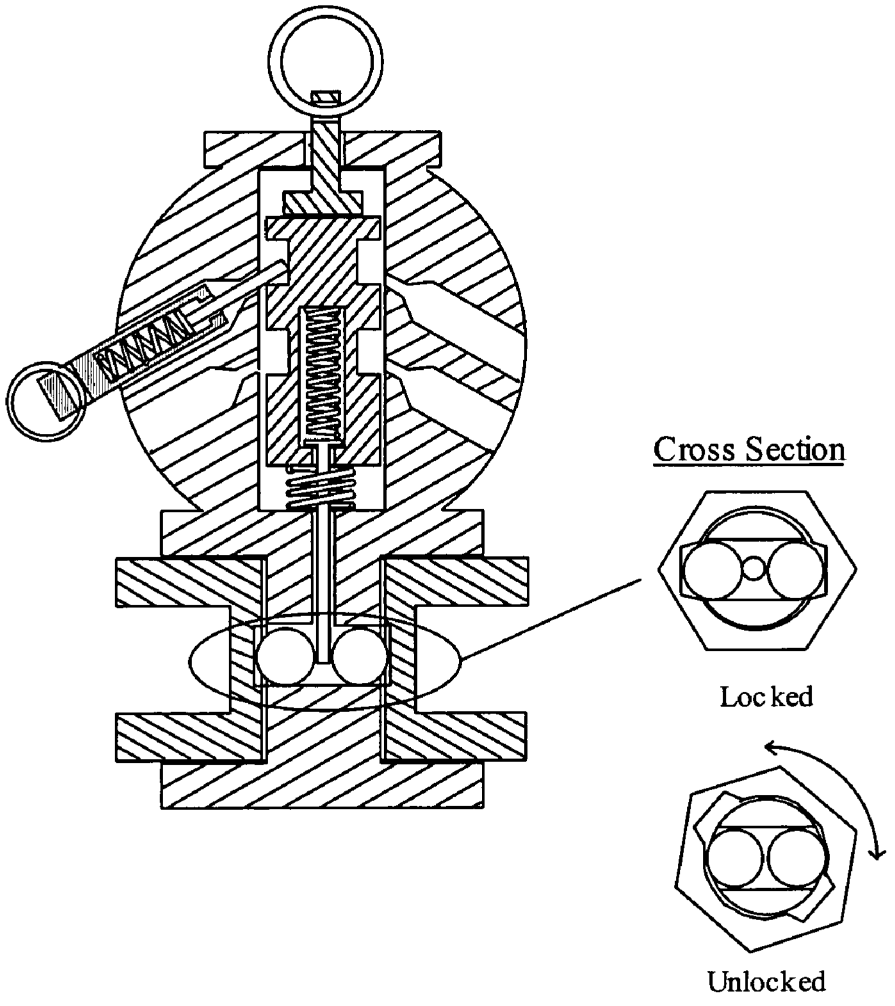
FIG. 4: Optional rotational and/or positional lock.

In one embodiment, the mechanism can also employ the use of a rotational and/or positional lock. See FIG. 4. Other embodiments include multi-position linear or multi-position rotational locks.

Figure 12:
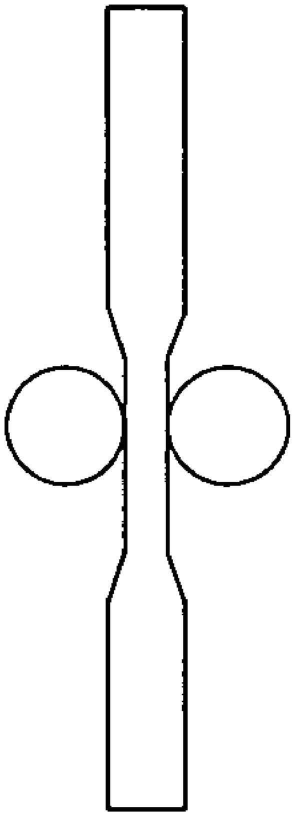
FIG. 12: Tapered or shearing release pins substituted for the simple linear release pin
Figure 13:
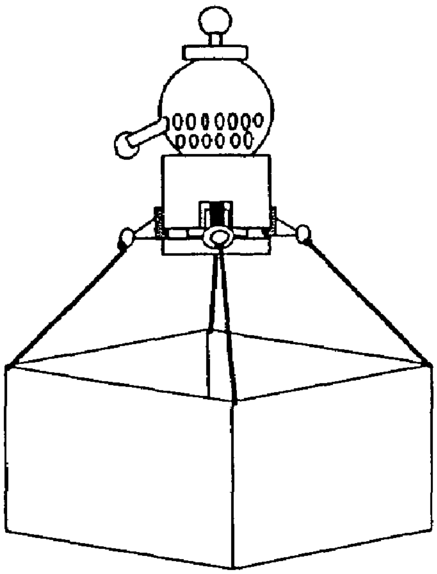
FIG. 13: Depiction of a low force release mechanism with a box used as the container.
Figure 14:
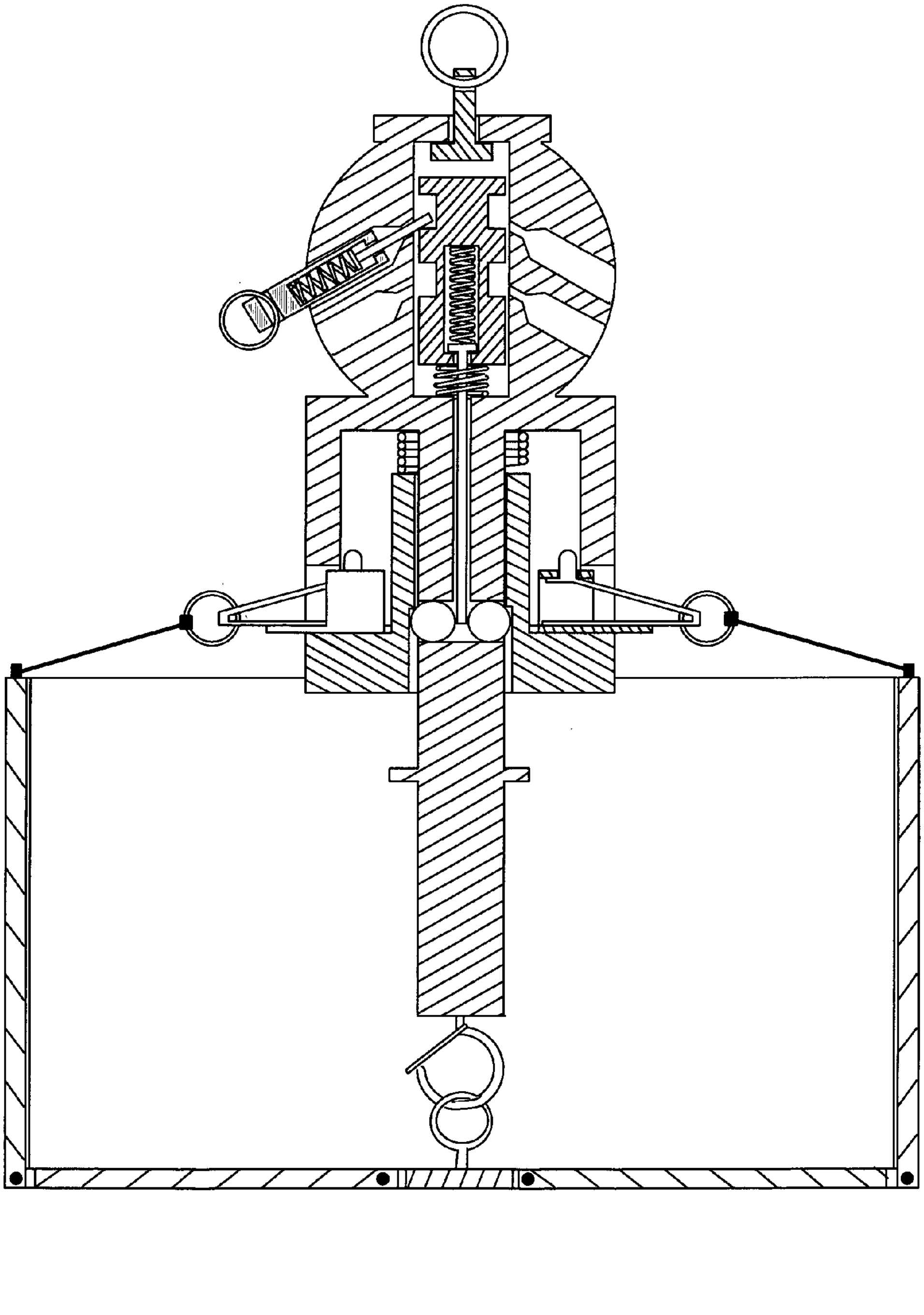
FIG. 14: Depiction of a low force release mechanism with a collapsible box used as the container.
Figure 15:
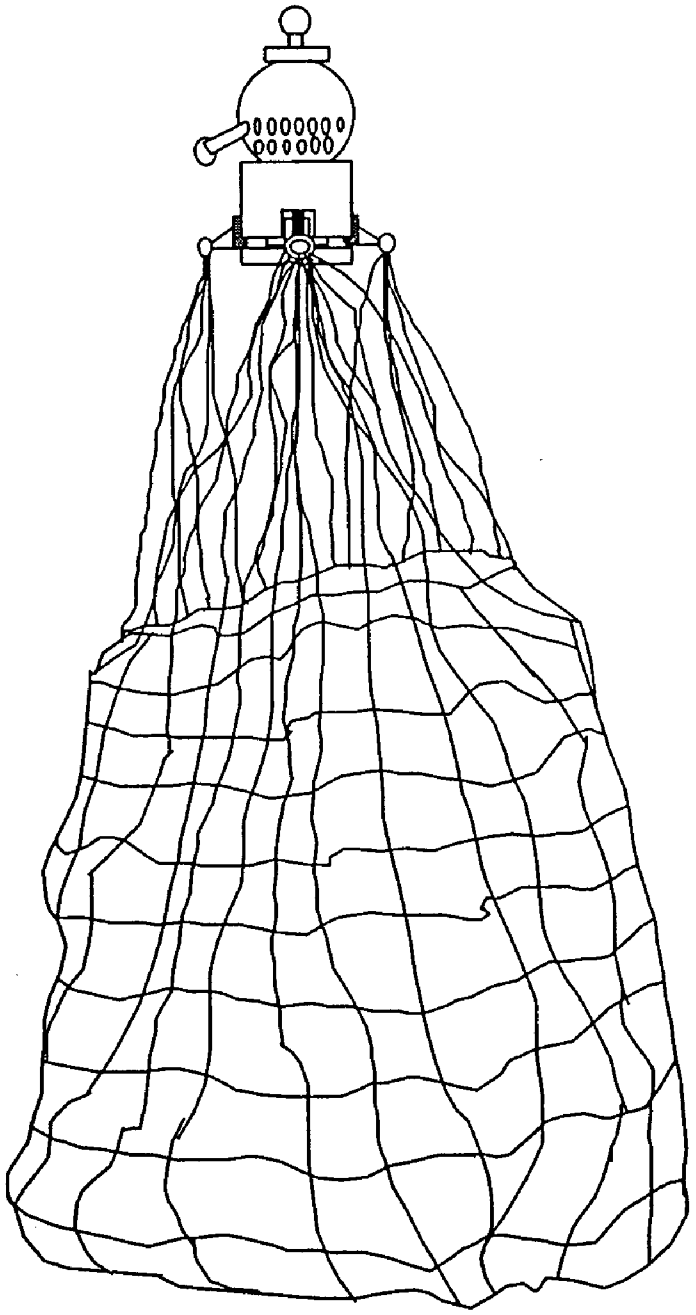
FIG. 15: Depiction of a low force release mechanism with a net used as the container.

In yet another embodiment, ball bearings could be replaced with roller slugs (See FIG. 12), and tapered or shearing release pins could be substituted for the simple linear release pin as depicted in FIG. 1 (See FIG. 12). The use of a lubricant and/or roller slugs would further reduce the force required to extract the release pin as the force required to overcome the friction is the product of the coefficient of static friction and the normal force of the object. Generally, the coefficient of static friction for dry surfaces (metal on metal) is between 0.15-0.60. However, the coefficient of static friction for rollers may be significantly lower which results in a lower force required to activate the mechanism.

Some applications may require the use of multiple trigger pins. In such embodiments, the use of one or more trigger pins pulled in succession, would permit the activation of the release mechanism. In applications such as a pinata, where a longer use by participants is desired, the use of multiple trigger pins would make it impossible for the first trigger pin to open the piñata. In yet another embodiment, the use of a multi-staged release pin could be used to further reduce the force to activate the release mechanism.

Figure 9:
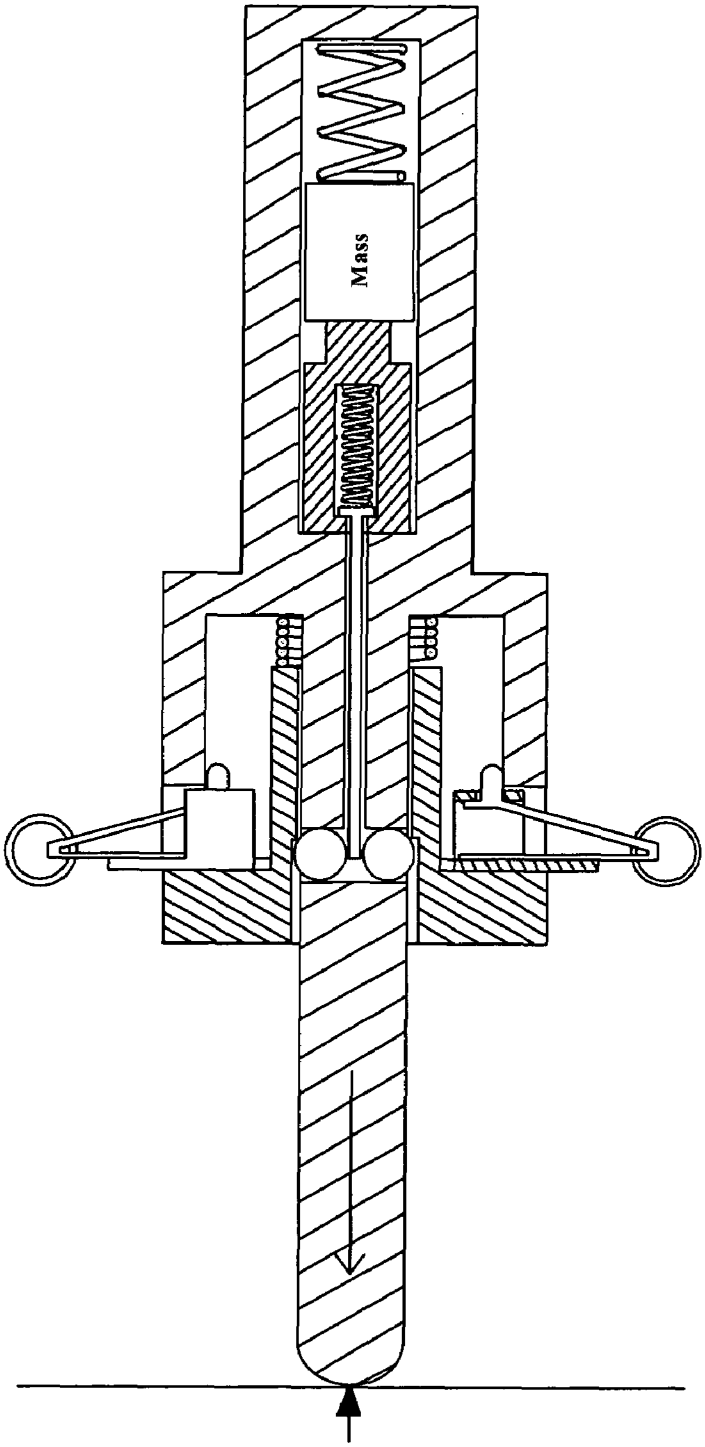
FIG. 9: Impulse release trigger mechanism activation system.
Figure 10:
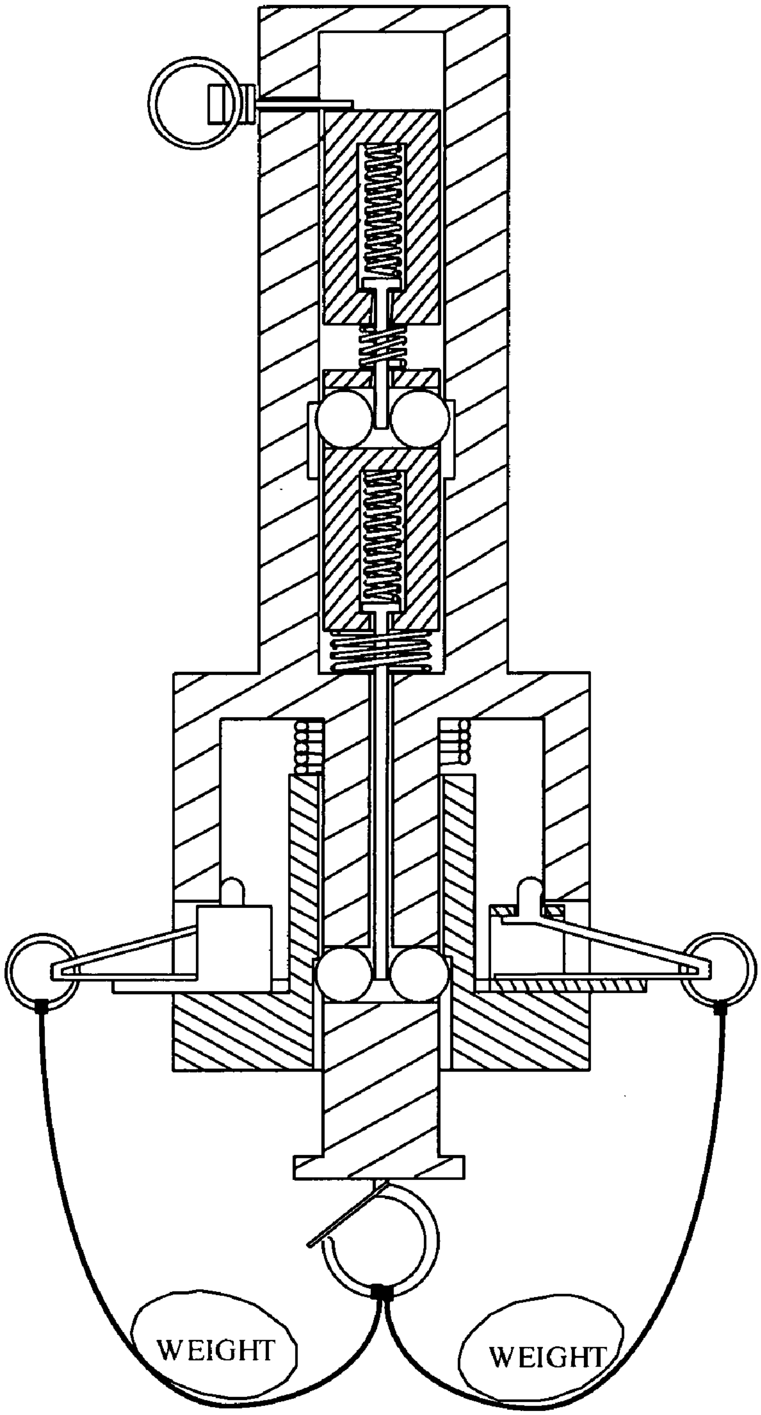
FIG. 10: Multi-stage trigger mechanism activation system.
Figure 11:
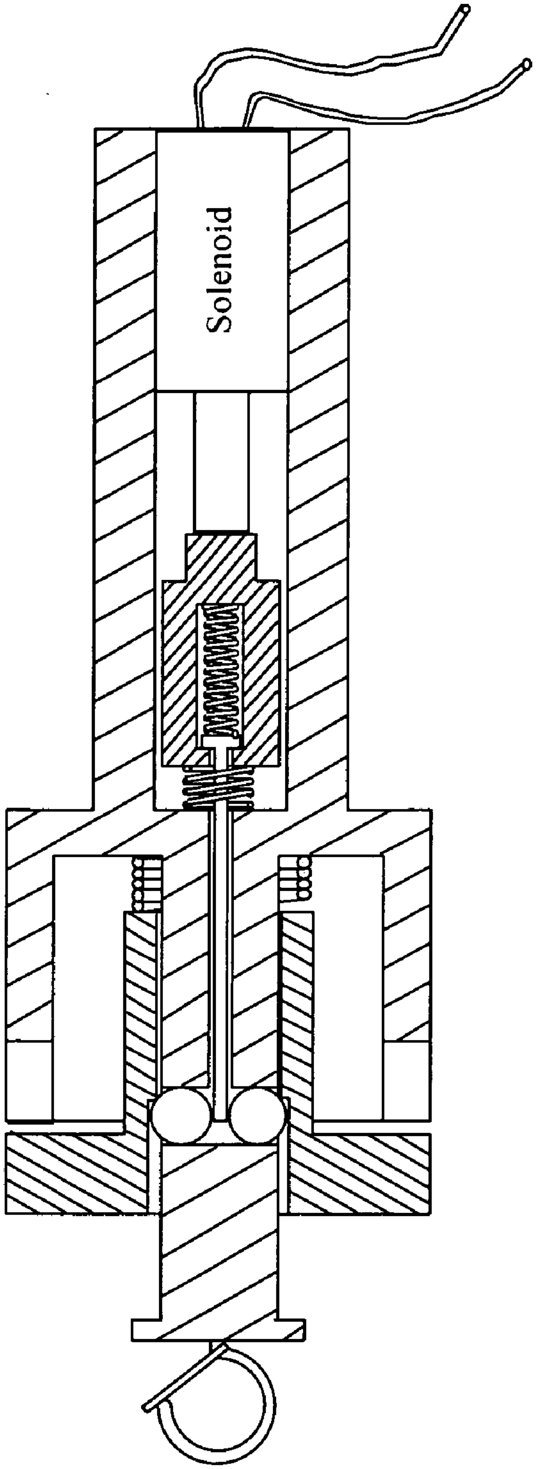
FIG. 11: Solenoid actuated release trigger mechanism activation system.

In other commercial applications where trigger pins may not be desired, the invention allows for the use of alternative trigger mechanisms, such as impulse actuated release where a in with a mass on the end could be used for an impulse/impact release (See FIG. 9), multi-staged release triggers (FIG. 10), solenoid actuated release (FIG. 11) where electronics would allow radio or remote activation of release, impact actuated release or barometric or pressure actuated release.

In yet another embodiment, the trap could be modified to allow 360° rotational movement of a contain clip or slug around the shaft axism. In addition, a 360° rotational freedom tether and release trap is also an embodiment permitted by the invention.

The invention claimed is:

1. A low-force release mechanism comprising:

a main structure including a cavity and a shaft;

a trap having a hollowed portion and being received by the main structure, the hollowed portion surrounding the shaft;

a moveable internal spring pin having an opened cavity and a retaining portion, the internal spring pin being located within the cavity of the main structure; the cavity of the spring pin having an internal spring to facilitate locking of the trap and the internal spring pin in any order;

a release pin located within the internal spring pin and extending into the shaft;

a lift spring interposed between the release pin and the main structure enabling the release pin to be biased;

at least one trigger being positioned in a hole of the main structure and engaging the retaining portion of the internal spring pin to retain the internal spring pin in a locked position;

attachments by which a container is attached to the main structure and the trap; and at least one ball bearing or slug located in the hollowed portion of the trap and the shaft, and interacting with the hollowed portion of the trap and the release pin;

the release pin being moveable to effect a locked position of the ball bearing or the slug against the trap;

whereby removing the trigger from the hole of the main structure unlocks the internal spring pin and the release pin to allow the ball bearing or the slug to retract thus releasing the trap which allows the attachments to be released.

2. The low-force release mechanism of claim 1, further comprising a hanger.

3. The low-force release mechanism of claim 1, further comprising a movable hanger through which force can be applied to move the position of the internal spring pin or receive force applied by the main structure as a point of external attachment.

4. The low-force release mechanism of claim 1, wherein the container is selected from the group consisting of: a bag, a box, a collapsible box, and a net.

5. The low-force release mechanism of claim 1, further comprising a string attached to the trigger.

6. The low-force release mechanism of claim 1, further comprising a trap spring interposed between the trap and the main structure.

* * * * *